May 17, 1938.　　W. NOVEY ET AL　　2,117,849
OIL SEAL RING
Filed July 11, 1936
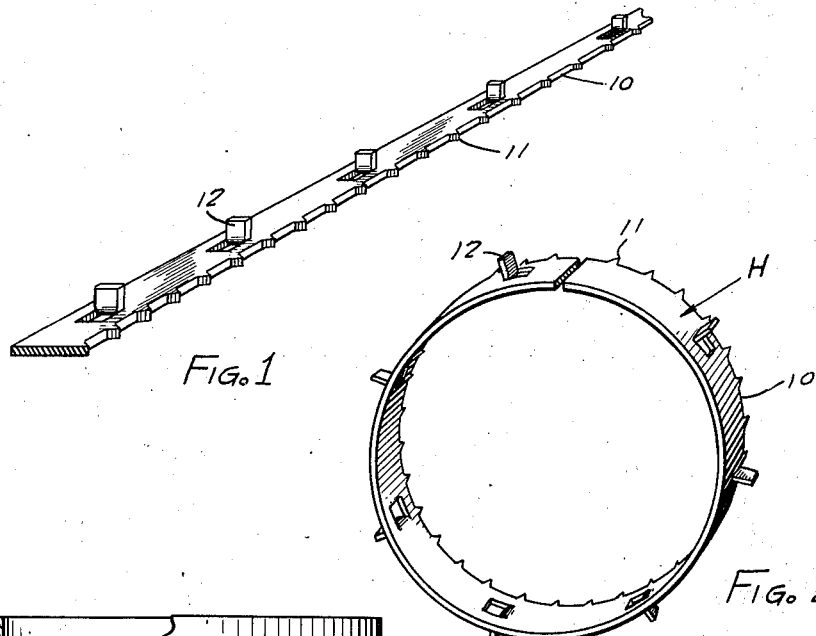
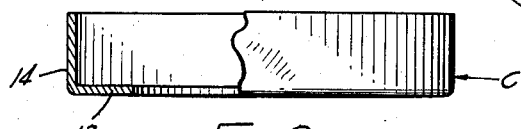
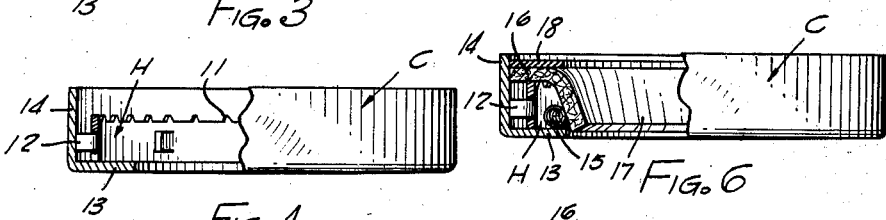
INVENTOR.
WILLIAM NOVEY &
JOHN C. TROMBA.
BY Joshua R. Potts
ATTORNEY.

UNITED STATES PATENT OFFICE 2,117,849

OIL SEAL RING

William Novey and John C. Tromba, Torrington, Conn., assignors to The Fitzgerald Manufacturing Company, Torrington, Conn., a corporation of Connecticut Application July 11, 1936, Serial No. 90,097

2 Claims. (Cl. 288—1)

This invention has to do with oil seals such as are commonly employed in association with the axles of motor vehicles to prevent the leakage of oil therealong.

The axle of a motor vehicle is ordinarily enclosed within a housing which is spaced thereabout, and oil seal rings of the type with which this invention is concerned ordinarily must make an effective seal, not only along the axle itself, but also with the bore of the housing. Accordingly, oil seal rings designed for this particular use have assumed certain conventional characteristics.

Ordinarily a flexible washer having a tubular extension which encompasses the axle itself is included as an essential characteristic of one of these rings. A garter spring is ordinarily positioned about the tubular portion of the washer to maintain the same in intimate engagement with the axle. This washer, together with the garter spring, is ordinarily housed in a casing which is made up from a cup shaped member having a flat ring-like wall, and a cylindrical wall, and another ring which cooperates with the cup shaped member to define a channel in which the washer and spring are housed.

Some suitable structure must be also included to maintain the washer in proper sealing engagement with one of the ring-like walls of the channel structure constituting its housing.

With the above noted conditions in mind, this invention has in view, as its foremost objective, the provision of an oil seal ring of the character described, which includes a novel structure for maintaining the flexible washer in sealing engagement with one of the walls of the seal ring casing.

More particularly this invention has in view as an objective the provision of an oil seal ring of the particular type above described, in which a hold strip is interposed between one of the walls of the casing and the washer, and which hold strip includes means for maintaining the same in properly spaced relation with respect to the cylindrical wall of the casing.

In carrying out this thought in a practical embodiment, this invention contemplates the use of a strip intended to hold the washer in proper assembled position within the casing, and which strip is formed with a plurality of lugs which engage the cylindrical wall of the casing, to maintain the strip in properly spaced relation with respect thereto.

Yet another object of the invention is to provide a hold strip or ring of the character above noted, which is designed to maintain the washer in properly assembled position within the casing, and which ring is formed along one edge with a plurality of teeth which bite into the flexible washer to provide the desired engagement with respect thereto.

Another important phase of the present invention is the method of assembling an oil seal ring, which includes a hold strip or ring of the character above described. In accordance with this invention, this ring itself is first fashioned by being stamped from metal in strip form, and then bent into its ring-like formation.

The casing element is then fashioned from sheet metal by stamping operations to be hereinafter described, and the ring and other elements assembled therewith in a manner which constitutes a distinctly novel method.

These and other more detailed objects and advantages will in part become apparent, and in part be hereinafter described, as the description of the invention proceeds.

The invention, therefore, comprises an oil seal ring consisting of a casing defining a channel-like structure, in which is housed a flexible washer having a tubular extending portion about which is disposed a garter spring. A hold strip or ring formed with projections for maintaining the same spaced from the cylindrical wall of the casing is included in the casing, and has teeth formed along one edge, and which teeth bite into the flexible washer. The invention also embraces the method of assembling a ring of the above described construction.

For a full and more complete understanding of the invention, reference may be had to the following description and accompanying drawing, wherein Figure 1 is a view in perspective of a strip of metal after the initial stamping operation, employed to form the hold strip or ring, Figure 2 is another perspective illustration, bringing out the construction of the hold ring per se, Figure 3 is a side view, partly in section and partly in elevation, bringing out one step in the formation of the seal ring casing, Figure 4 is another side view similar to Figure 3, showing the hold ring as assembled in the casing, Figure 5 is another showing similar to Figures 3 and 4, bringing out the manner in which the flexible washer and garter spring are assembled in the casing, Figure 6 is another similar view, showing the assembly of the flat ring member which completes the casing structure, and Figure 7 is another view showing the completely assembled oil seal ring.

Referring now to the drawing, wherein like reference characters denote corresponding parts, a hold strip or ring is shown in Figure 2, and referred to by the reference character H. This ring H is formed by first stamping from sheet metal a strip such as shown in Figure 1. This strip has one edge, referred to as 10, formed with a plurality of teeth 11, while a plurality of lugs 12 are formed in the strip itself, and spaced a suitable distance apart.

After the strip, shown in Figure 1, has been stamped from sheet metal, it is bent into the ring-like formation, brought out in Figure 2, to provide the completed hold ring H.

Referring now more particularly to Figure 3, there is illustrated a cup shaped member C, which comprises a flat ring-like wall 13, and a cylindrical wall 14. This member C may be made by subjecting a properly dimensioned ring of metal to the effect of dies, to form it into the cup shaped structure shown.

Figure 4 shows the hold ring H as assembled with the cup shaped member C, and it is notable that the lugs 12 serve to properly position this ring H within the cup shaped member C, as the engagements of these lugs 12 with the inner surface of the wall 14 properly space the ring H therefrom.

Figure 5 shows a flexible washer W, which may be made from leather or any suitable fibrous material, and a garter spring 15 assembled in the cup shaped casing member C. It is notable that the washer W is formed with a flat ring-like wall 16, which engages the teeth 11 of the hold ring H, and a tubular-like portion 17, which is intended to encompass a shaft with which the seal ring is associated. The garter spring 15 is disposed about the tubular portion 17, to have the desired gripping effect thereon.

In Figure 6 the assembly is shown with the addition of another ring-like wall element 18, which completes the casing structure.

As shown in Figure 7 the free edge of the cylindrical wall 14 is peened or bent over the member 18, to maintain the elements in their assembled relationship. This bent edge is referred to at 19.

It is notable that prior to bending over of the free edge of the cylindrical wall 14, pressure is applied to the member 18, so that the portion 16 of the washer W is forced down over the teeth 11. The application of this pressure prior to the formation of the lip flange 19 insures of the flexible washer being properly positioned in the assembly.

While a preferred specific embodiment of the invention is hereinbefore set forth, it is to be clearly understood that we are not to be limited to the exact construction and method illustrated and described, because various modifications of these details may be provided in putting the invention into practice within the purview of the appended claims.

We claim:

1. An oil seal ring of the character described comprising a casing of channel-like formation having a cylindrical wall and spaced end walls, a flexible washer having a tubular portion, said washer being positioned between the end walls, a garter spring disposed about the tubular portion of the washer, and a cylindrical hold ring engaging one of said end walls and said flexible washer, said hold ring being formed with lugs punched from the cylindrical part thereof and engaging the cylindrical wall for maintaining the hold ring in spaced relation with respect thereto.

2. An oil seal ring of the character described comprising a cup shaped member defined by an end wall and a cylindrical wall, a ring-like member constituting another end wall spaced from the first mentioned end wall, and maintained in position with respect thereto by a flange formed integrally with the cylindrical wall, a flexible washer having a flat wall engaging said last mentioned end wall, a tubular portion and garter spring about said tubular portion of the flexible washer, and a cylindrical hold ring having one edge in engagement with the end wall of the cup shaped member, the other edge of the said hold ring having teeth embedded in the said flexible washer, and lugs punched from the cylindrical part of the said hold ring engaging the cylindrical wall with the cup shaped member.

WILLIAM NOVEY.
JOHN C. TROMBA.